(12) United States Patent
Enge et al.

(10) Patent No.: US 9,731,905 B2
(45) Date of Patent: Aug. 15, 2017

(54) APPARATUS AND METHOD FOR STOCKPILE CONTROL SYSTEM

(71) Applicant: Kolberg-Pioneer, Inc., Yankton, SD (US)

(72) Inventors: Keith Enge, Yankton, SD (US); Mark Westerman, Yankton, SD (US)

(73) Assignee: Kolberg-Pioneer, Inc., Yankton, SD (US)

( * ) Notice: Subject to any disclaimer, the term of this patent is extended or adjusted under 35 U.S.C. 154(b) by 0 days.

(21) Appl. No.: 15/174,360

(22) Filed: Jun. 6, 2016

(65) Prior Publication Data

US 2016/0355351 A1 Dec. 8, 2016

Related U.S. Application Data

(60) Provisional application No. 62/171,736, filed on Jun. 5, 2015.

(51) Int. Cl.
*B65G 43/00* (2006.01)
*B65G 21/14* (2006.01)
*B65G 41/00* (2006.01)

(52) U.S. Cl.
CPC .............. *B65G 43/00* (2013.01); *B65G 21/14* (2013.01); *B65G 41/002* (2013.01); *B65G 41/008* (2013.01)

(58) Field of Classification Search
CPC ........ B65G 43/08; B65G 21/14; B65G 43/00; B65G 41/008; B65G 69/00; B65G 69/04
USPC ................ 198/507, 508, 571, 572, 588, 812
See application file for complete search history.

(56) References Cited

U.S. PATENT DOCUMENTS

| | | | | |
|---|---|---|---|---|
| 3,456,818 A | * | 7/1969 | Massey ................ | B65G 65/466 198/666 |
| 3,946,506 A | * | 3/1976 | Snow, Jr. .............. | E01C 19/004 198/301 |
| 4,172,518 A | * | 10/1979 | Grayson .............. | B65G 65/005 198/301 |
| 4,445,814 A | * | 5/1984 | Malmstrom ....... | B65G 69/0433 198/508 |
| 2010/0089723 A1 | * | 4/2010 | O'Connor ............. | B65G 65/28 198/508 |
| 2013/0341159 A1 | * | 12/2013 | Lopes ..................... | E02F 3/181 198/507 |

* cited by examiner

*Primary Examiner* — James R Bidwell
(74) *Attorney, Agent, or Firm* — Chambliss, Bahner & Stophel, P.C.

(57) ABSTRACT

A stockpile control system adapted for use on a stockpile conveyor comprising a sensor that is disposed on the stockpile conveyor, a limit switch that is disposed on the stockpile conveyor, a pile probe that is disposed on the stockpile conveyor, and a microprocessor that is in operative communication with the limit switch and the sensor. The stockpile conveyor is adapted to move, the sensor is adapted to measure the location of the stockpile conveyor, the limit switch is adapted to limit the movement of the stockpile conveyor, the pile probe is adapted to measure a distance between the stockpile conveyor and a stockpile, and the microprocessor is adapted to control the movement of the stockpile conveyor. A method for controlling the production of a stockpile comprising providing a stockpile control system, calculating one or more stockpile boundaries, and controlling the movement of the stockpile conveyor.

16 Claims, 10 Drawing Sheets

APPARATUS AND METHOD FOR STOCKPILE CONTROL SYSTEM

CROSS-REFERENCES TO RELATED APPLICATIONS/PATENTS

This application relates back to and claims the benefit of priority from U.S. Provisional Application for Patent Ser. No. 62/171,736 titled "Stockpile System" and filed on Jun. 5, 2015.

FIELD OF THE INVENTION

The present invention relates generally to systems and methods for controlling items of equipment, and particularly to systems and methods for controlling stockpile equipment.

BACKGROUND AND DESCRIPTION OF THE PRIOR ART

It is known to use equipment to produce stockpiles. Conventional systems and methods, however, suffer from one or more disadvantages. For example, conventional stockpile systems and methods are undesirably inaccurate and imprecise in terms of placing and locating a stockpile. Conventional stockpile systems and methods also do not permit the user to repeat previous stockpile patterns. Conventional stockpile systems and methods are also difficult to use. In addition, conventional stockpile systems and methods rely on a timed event within the program to determine equipment location and thus material placement. Conventional stockpile systems and methods also do not sufficiently calculate and control the boundaries of the stockpile and the movement of the stockpile conveyor. In addition, conventional stockpile systems and methods do not maximize stockpile capacity or stockpile desegregation.

It would be desirable, therefore, if an apparatus and method for a stockpile control system could be provided that would accurately and precisely place and locate a stockpile. It would also be desirable if such an apparatus and method for a stockpile control system could be provided that would allow the user to repeat previous stockpile patterns. It would be further desirable if such an apparatus and method for a stockpile control system could be provided that would be easy to use. It would be still further desirable if such an apparatus and method for a stockpile control system could be provided that would determine equipment location using one or more sensors and computer-based software. In addition, it would be desirable if such an apparatus and method for a stockpile control system could be provided that would substantially continuously calculate and control the boundaries of the stockpile and the movement of the stockpile conveyor. It would also be desirable if such an apparatus and method for a stockpile control system could be provided that would maximize stockpile capacity and stockpile desegregation.

ADVANTAGES OF THE PREFERRED EMBODIMENTS OF THE INVENTION

Accordingly, it is an advantage of the preferred embodiments of the invention claimed herein to provide an apparatus and method for a stockpile control system that accurately and precisely places and locates stockpiles. It is also an advantage of the preferred embodiments of the invention claimed herein to provide an apparatus and method for a stockpile control system that is allows the user to repeat stockpile patterns. It is another advantage of the preferred embodiments of the invention claimed herein to provide an apparatus and method for a stockpile control system that is easy to use. It is a further advantage of the preferred embodiments of the invention claimed herein to provide an apparatus and method for a stockpile control system that determines the equipment location using one or more sensors and computer-based software. It is a still further advantage of the preferred embodiments of the invention claimed herein to provide an apparatus and method for a stockpile control system that substantially continuously calculate and control the boundaries of the stockpile and the movement of the stockpile conveyor. It is yet another advantage of the preferred embodiments of the invention claimed herein to provide an apparatus and method for a stockpile control system that maximizes stockpile capacity and stockpile desegregation.

Additional advantages of the preferred embodiments of the invention will become apparent from an examination of the drawings and the ensuing description.

SUMMARY OF THE INVENTION

The apparatus of the invention comprises a stockpile control system adapted for use on a stockpile conveyor. The preferred stockpile control system comprises a sensor that is disposed on the stockpile conveyor, a limit switch that is disposed on the stockpile conveyor, a pile probe that is disposed on the stockpile conveyor, and a microprocessor that is in operative communication with the limit switch and the sensor. The stockpile conveyor is adapted to move, the sensor is adapted to measure the location of the stockpile conveyor, the limit switch is adapted to limit the movement of the stockpile conveyor, the pile probe is adapted to measure a distance between the stockpile conveyor and a stockpile, and the microprocessor is adapted to control the movement of the stockpile conveyor.

The method of the invention comprises a method for controlling the production of a stockpile. The preferred method comprises providing a stockpile control system. The preferred stockpile control system comprises a sensor that is disposed on the stockpile conveyor, a limit switch that is disposed on the stockpile conveyor, a pile probe that is disposed on the stockpile conveyor, and a microprocessor that is in operative communication with the limit switch and the sensor. The stockpile conveyor is adapted to move, the sensor is adapted to measure the location of the stockpile conveyor, the limit switch is adapted to limit the movement of the stockpile conveyor, the pile probe is adapted to measure a distance between the stockpile conveyor and a stockpile, and the microprocessor is adapted to control the movement of the stockpile conveyor. The preferred method further comprises calculating one or more stockpile boundaries, and controlling the movement of the stockpile conveyor.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
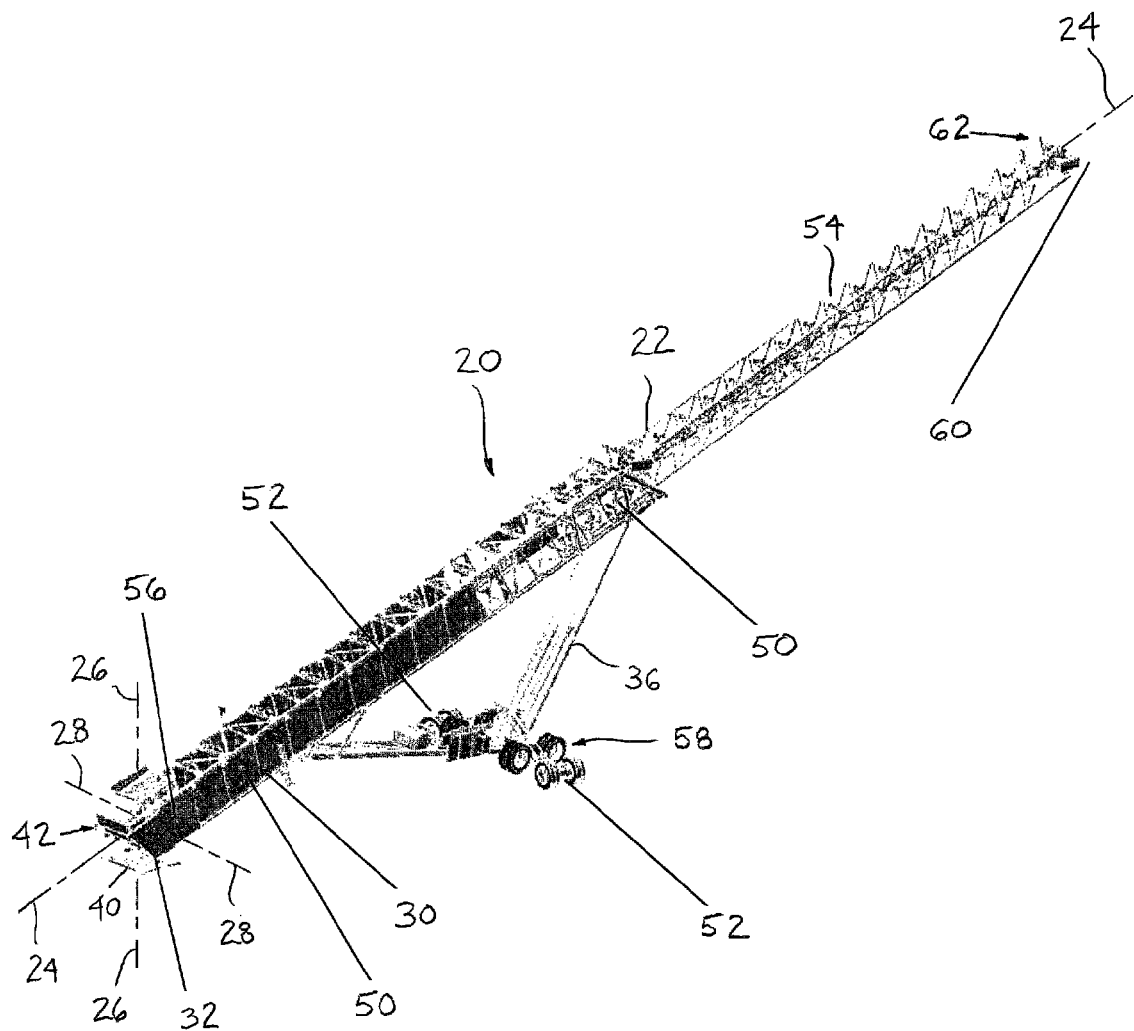
FIG. 1 is a front perspective view of the preferred embodiment of the stockpile control system on an exemplary stockpile conveyor in accordance with the present invention.

Referring now to the drawings, the preferred embodiment of the apparatus and method for a stockpile control system in accordance with the present invention is illustrated by FIGS. 1 through 10. As shown in FIGS. 1-10, the preferred apparatus and method for a stockpile control system are adapted to accurately and precisely place and locate stockpiles. The preferred embodiments of the invention claimed herein also provide an apparatus and method for a stockpile control system that allows the user to repeat stockpile patterns. The preferred embodiments of the invention claimed herein further provide an apparatus and method for a stockpile control system that is easy to use. The preferred embodiments of the invention claimed herein still further provide an apparatus and method for a stockpile control system that determines the equipment location using one or more sensors and computer-based software. The preferred embodiments of the invention claimed herein also provide an apparatus and method for a stockpile control system that substantially continuously calculates and controls the boundaries of the stockpile and the movement of the stockpile conveyor. In addition, the preferred embodiments of the invention claimed herein provide an apparatus and method for a stockpile control system that maximizes stockpile capacity and stockpile desegregation.

Referring now to FIG. 1, a front perspective view of the preferred embodiment of the stockpile control system on an exemplary stockpile conveyor in accordance with the present invention is illustrated. As shown in FIG. 1, the preferred stockpile control system is designated generally by reference numeral 20. Preferred stockpile control system 20 is disposed, in part, on exemplary stockpile conveyor 22 which is adapted to move in one or more directions. Preferably, stockpile conveyor 22 is adapted to move between a retracted position and an extended position along stockpile longitudinal axis 24. Exemplary stockpile conveyor 22 is also adapted to move pivotally about vertical axis 26 and horizontal axis 28. More particularly, preferred stockpile control system 20 comprises a sensor adapted to measure the location of stockpile conveyor 22, a limit switch adapted to limit the movement of the stockpile conveyor, and a pile probe adapted to measure the distance between stockpile conveyor and a stockpile. Preferably, the sensor, the limit switch, and the pile probe are disposed on exemplary stockpile conveyor 22. Preferably, the sensor comprises angle sensor 30 and rotation sensor 32. Preferred angle sensor 30 is adapted to measure the pivotal movement of stockpile conveyor 22 about horizontal axis 28 so as to measure the angle of the stockpile conveyor relative to a horizontal plane. Preferred stockpile conveyor 22 includes one or more actuators 36 adapted to control the movement of the conveyor about horizontal axis 28. Preferred rotation sensor 32 is adapted to measure the pivotal movement of stockpile conveyor 22 as the conveyor is pivotally moved about vertical axis 26. Preferably, stockpile conveyor 22 is rotatably mounted to pivot plate 40 at proximal end 42 of the conveyor.

Still referring to FIG. 1, the preferred limit switch comprises stinger switches 50 and travel switches 52. Preferred stinger switches 50 are adapted to limit the movement of stockpile conveyor 22 along longitudinal axis 24 and prevent stinger portion 54 of the stockpile conveyor from extending too far along the longitudinal axis. Preferred stinger switches 50 are also adapted to reset to a predetermined absolute value in the event the stinger switch is activated. Preferred stinger switches 50 comprise a hard-wired, redundant system. Preferably, stockpile control system 20 includes a winch and winch encoder 56 adapted to determine a length of stockpile conveyor 22 and control the movement of stinger portion 54 along longitudinal axis 24. Preferred winch encoder is 56 is in operative communication with a microprocessor. Preferred travel switches 52 are adapted to limit the pivotal movement of stockpile conveyor 22 about vertical axis 26 and prevent the stockpile conveyor from rotating about the vertical axis too far to the left and too far to the right. Preferred travel switches 52 are also adapted to reset to a predetermined absolute value in the event the travel switch is activated. Preferred travel switches 52 comprise a hard-wired, redundant system. Preferably, stockpile control system 20 includes one or more wheel and motor assemblies 58 adapted to control the movement of stockpile conveyor 22 about vertical axis 26. Preferred pile probe 60 is disposed at distal end 62 of stockpile conveyor 22. Preferred pile probe 60 is adapted to measure the distance between conveyor 22 and the top of a stockpile. While FIG. 1 illustrates the preferred configuration and arrangement of the stockpile conveyor, the sensors, the limit switches and the pile probe, it is contemplated that the stockpile conveyor, the sensors, the limit switches and the pile probe may be of any suitable configuration and arrangement.

Figure 2:
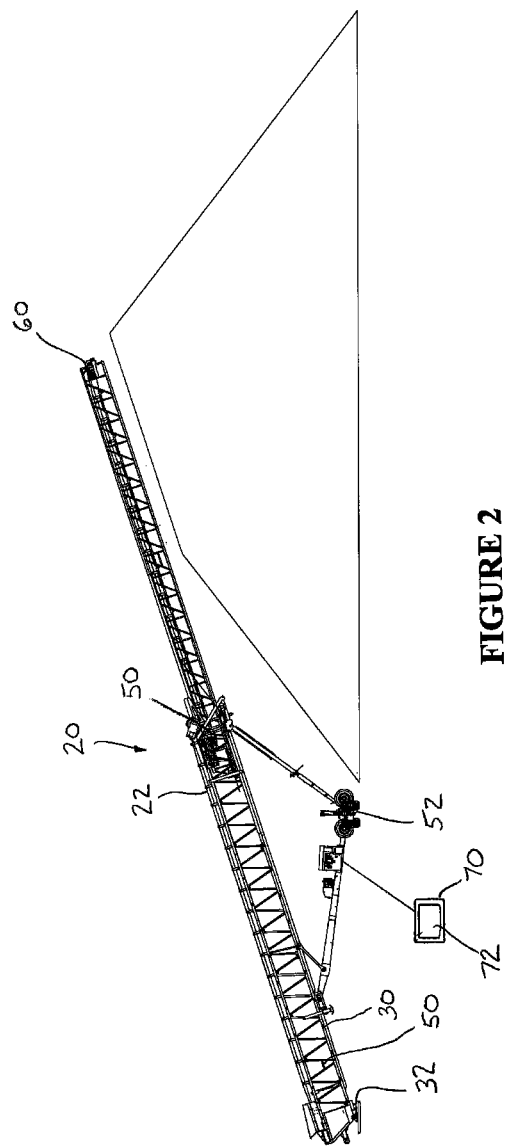
FIG. 2 is a front view of the preferred stockpile control system on the exemplary stockpile conveyor illustrated in FIG. 1 shown with a first exemplary stockpile.

Referring now to FIG. 2, a front view of preferred stockpile control system 20 on exemplary stockpile conveyor 22 is illustrated with a first exemplary stockpile. As shown in FIG. 2, preferred stockpile control system 20 is disposed, in part, on exemplary stockpile conveyor 22. More particularly, preferred stockpile control system 20 comprises angle sensor 30, rotation sensor 32, stinger switches 50, travel switch 52, pile probe 60, and microprocessor 70. Preferred microprocessor 70 operatively communicates with the sensors and the limit switches and is adapted to control the movement of stockpile conveyor 22. Preferred microprocessor 70 also comprises graphical interface 72. Preferably, microprocessor 70 allows stockpile control system 20 to substantially continuously calculate one or more stockpile boundaries and automatically adjust the movement of stockpile conveyor 22 in substantially real time. In addition, preferred microprocessor 70 allows stockpile control system 20 to substantially continuously calculate a material flow depth and automatically adjust the movement of the stockpile conveyor in substantially real time. Preferred microprocessor 70 further allows stockpile control system 20 to produce repeatable stockpiles.

Figure 3:
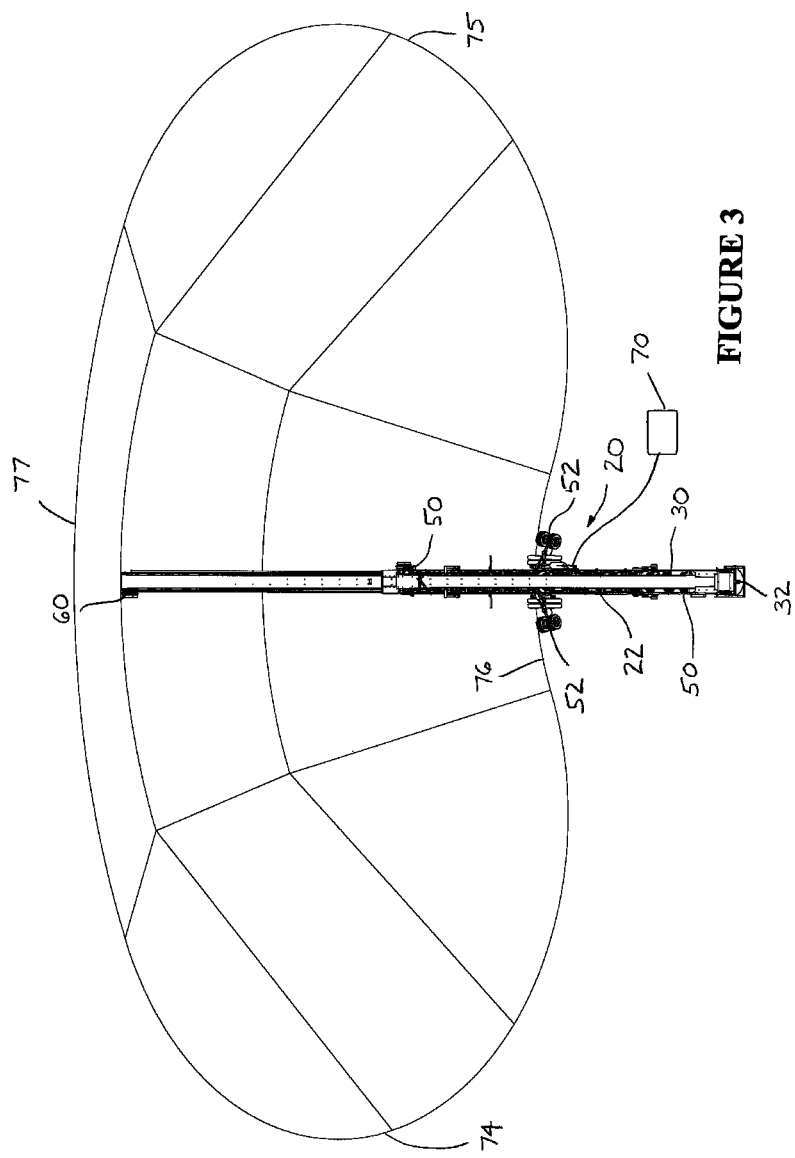
FIG. 3 is a top view of the preferred stockpile control system on the exemplary stockpile conveyor illustrated in FIGS. 1-2.

Referring now to FIG. 3, a top view of preferred stockpile control system 20 on exemplary stockpile conveyor 22 is illustrated. As shown in FIG. 2, preferred stockpile control system 20 is disposed, in part, on exemplary stockpile conveyor 22. More particularly, preferred stockpile control system 20 comprises angle sensor 30, rotation sensor 32, stinger switches 50, travel switches 52, pile probe 60, and microprocessor 70. Preferred stockpile control system 20 is adapted to produce a standard stockpile configuration. Preferably, standard stockpile configuration is defined by left boundary 74, right boundary 75, inner boundary 76, and outer boundary 77.

Figure 4:
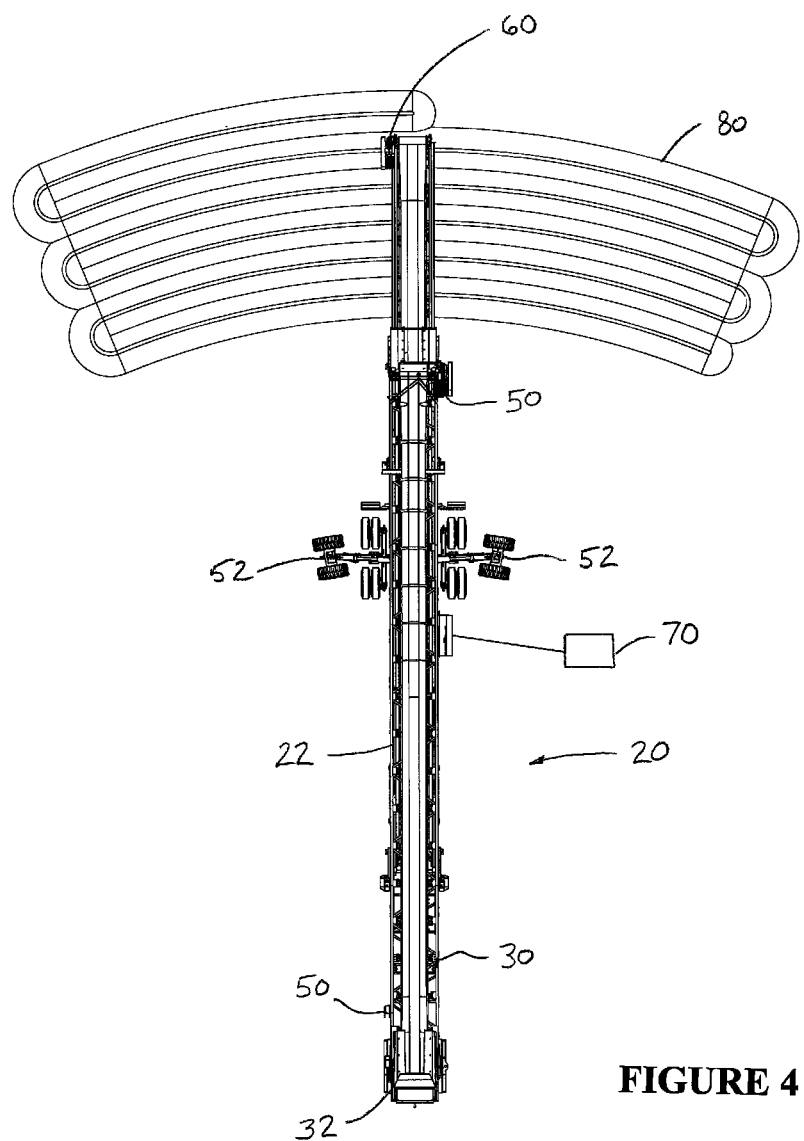
FIG. 4 is a top view of the preferred stockpile control system on the exemplary stockpile conveyor illustrated in FIGS. 1-3 shown with a second exemplary stockpile.

Referring now to FIG. 4, a top view of preferred stockpile control system 20 on exemplary stockpile conveyor 22 is illustrated with a second exemplary stockpile. As shown in FIG. 4, preferred stockpile control system 20 is disposed, in part, on exemplary stockpile conveyor 22. More particularly, preferred stockpile control system 20 comprises angle sensor 30, rotation sensor 32, stinger switches 50, travel switches 52, pile probe 60, and microprocessor 70. Second exemplary stockpile 80 is produced when preferred control system 20 operates in the radial continuous mode (see FIG. 8).

Figure 5:
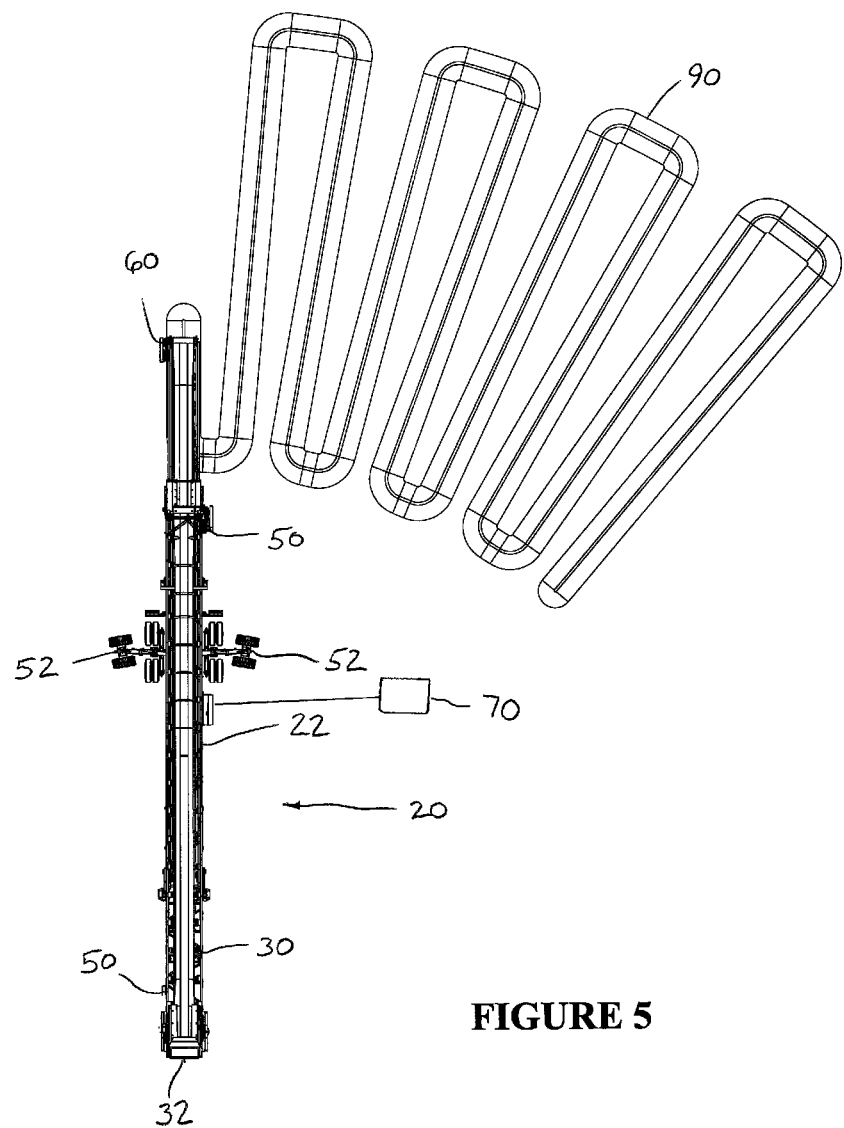
FIG. 5 is a top view of the preferred stockpile control system on the exemplary stockpile conveyor illustrated in FIGS. 1-4 shown with a third exemplary stockpile.

Referring now to FIG. 5, a top view of preferred stockpile control system 20 on exemplary stockpile conveyor 22 is illustrated with a third exemplary stockpile. As shown in FIG. 5, preferred stockpile control system 20 is disposed, in part, on exemplary stockpile conveyor 22. More particularly, preferred stockpile control system 20 comprises angle sensor 30, rotation sensor 32, stinger switches 50, travel switches 52, pile probe 60, and microprocessor 70. Third exemplary stockpile 90 is produced when preferred control system 20 operated in the inline continuous mode (see FIG. 9).

Figure 6:
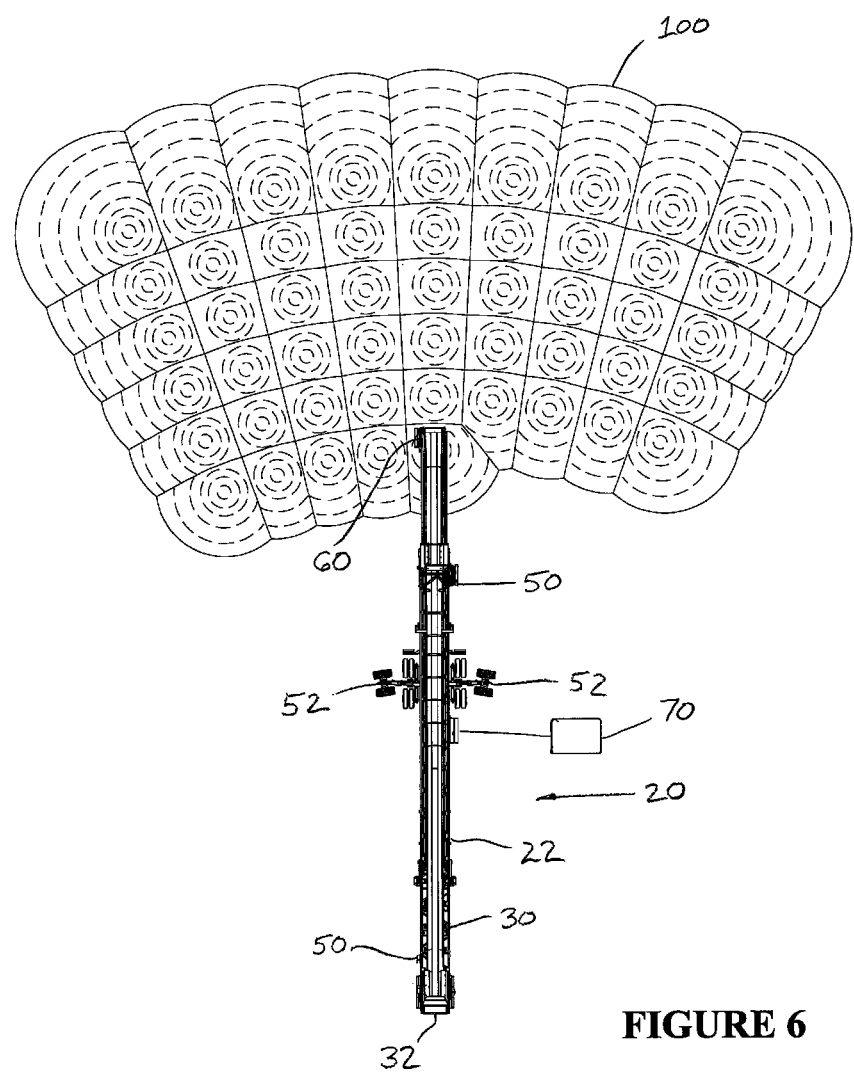
FIG. 6 is a top view of the preferred stockpile control system on the exemplary stockpile conveyor illustrated in FIGS. 1-5 shown with a fourth exemplary stockpile.

Referring now to FIG. 6, a top view of preferred stockpile control system 20 on exemplary stockpile conveyor 22 is illustrated with a fourth exemplary stockpile. As shown in FIG. 6, preferred stockpile control system 20 is disposed, in part, on exemplary stockpile conveyor 22. More particularly, preferred stockpile control system 20 comprises angle sensor 30, rotation sensor 32, stinger switches 50, travel switches 52, pile probe 60, and microprocessor 70. Fourth exemplary stockpile 100 is produced when preferred control system 20 operates in the radial conical mode (see FIG. 10).

Figure 7:
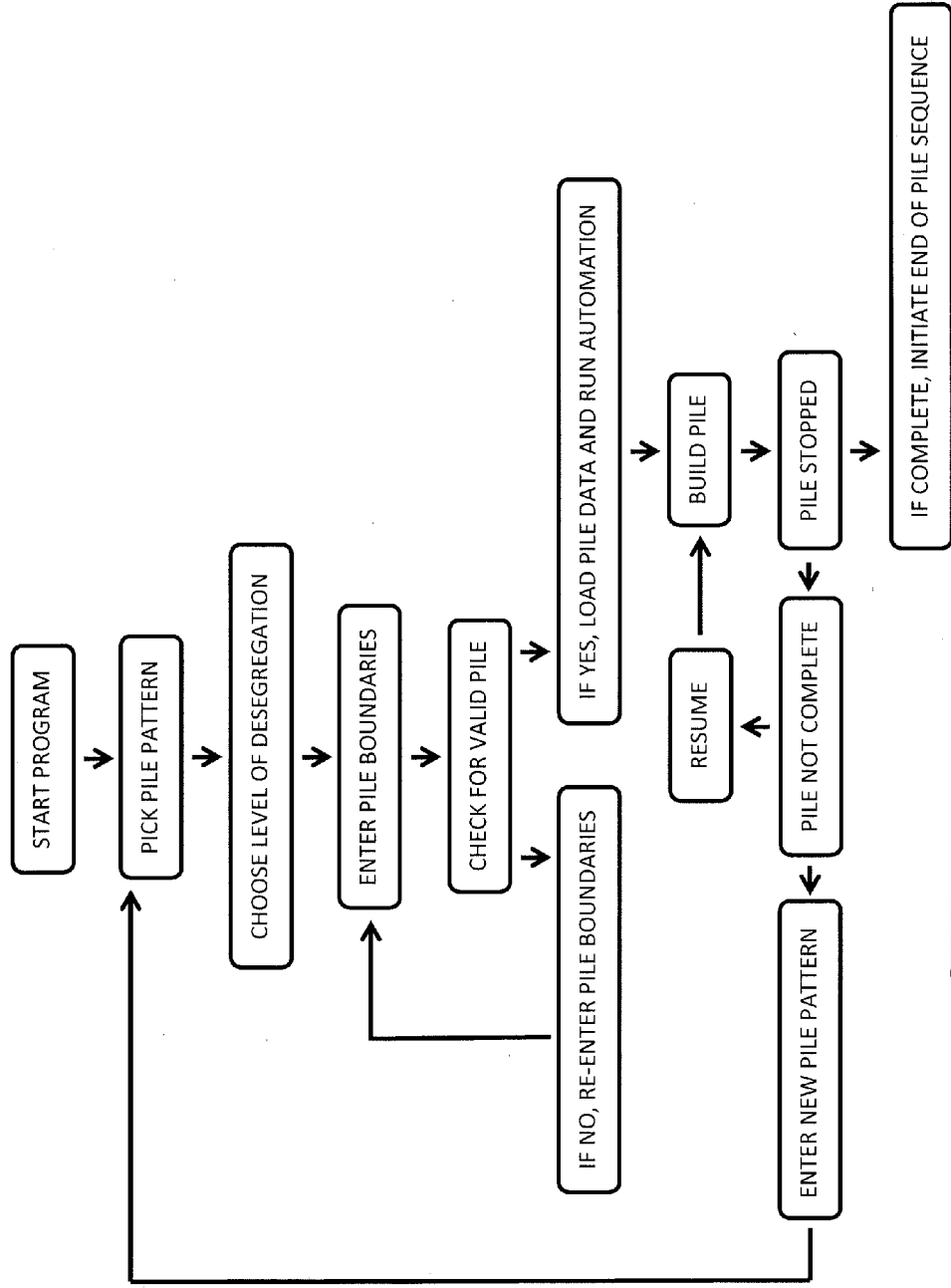
FIG. 7 is a flow chart illustrating the preferred sequence of operation for the stockpile control system.

Referring now to FIG. 7, a flow chart illustrating the preferred sequence for operation of preferred control system 20 is illustrated. As shown in FIG. 7, the flow chart illustrates the steps an operator would go through to select a stockpile pattern, a level of desegregation, and one or more stockpile boundaries. The preferred control system 20 then determines if the selections made by the operator constitute a valid stockpile. If they do, then preferred control system 20 loads the stockpile data and automatically builds the selected stockpile. If the selections made by the operator do not constitute a valid stockpile, then control system 20 requires the operator to change one or more of his selections and the validation process is repeated. After the selected stockpile is built, preferred control system 20 determines if one or more additional stockpiles are desired. If another stockpile is desired, then preferred control system 20 requires the operator to go through the stockpile selection process again and the validation process is repeated. If another stockpile is not desired, then preferred control system 20 automatically stops.

Figure 8:
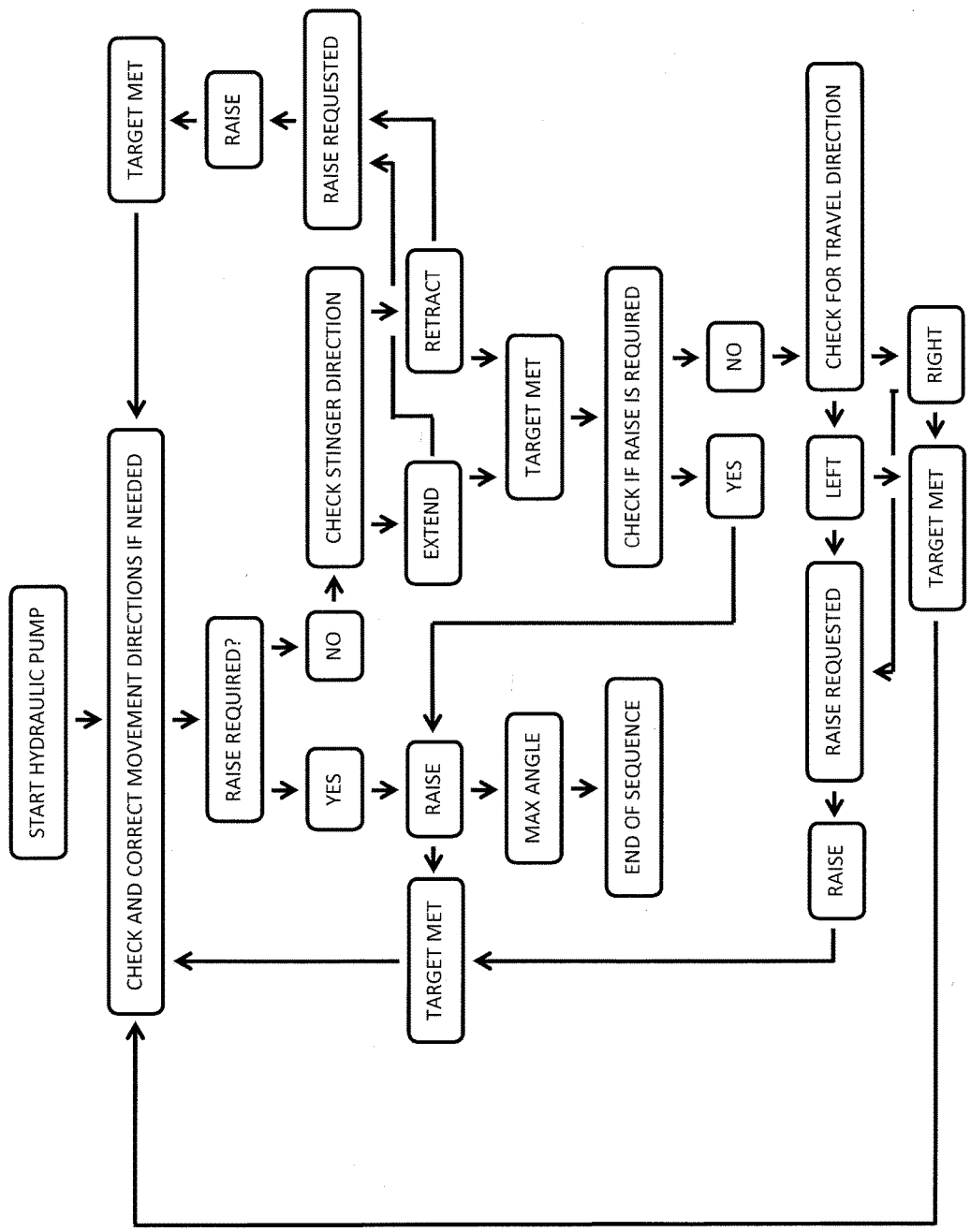
FIG. 8 is a flow chart illustrating the preferred method for controlling the production of a stockpile in the radial continuous mode.

Referring now to FIG. 8, a flow chart illustrating the preferred radial continuous mode process for producing a stockpile is provided. As shown in FIG. 8, preferred control system 20 automatically determines the location of the stockpile conveyor and whether the conveyor should be raised. If the conveyor does not need to be raised, then preferred control system 20 determines if the stinger should be extended or retracted, and again determines if a conveyor raise is required. If no conveyor raise is required, preferred control system 20 determines the travel direction. The conveyor is continuously moving in this mode until the stockpile is completed. When the stockpile is sensed with the pile probe, preferred control system 20 raises the conveyor up to the next tier, adjusts its limits, and resumes building the stockpile. Once the maximum pile height is achieved, preferred control system 20 sounds a horn, retracts the stockpile conveyor inwardly to the retracted position, and drives the conveyor slightly off to the side of the completed stockpile. The resulting stockpile pattern is a number of arcs that snake inward or outward at the left and right boundaries.

Figure 9:
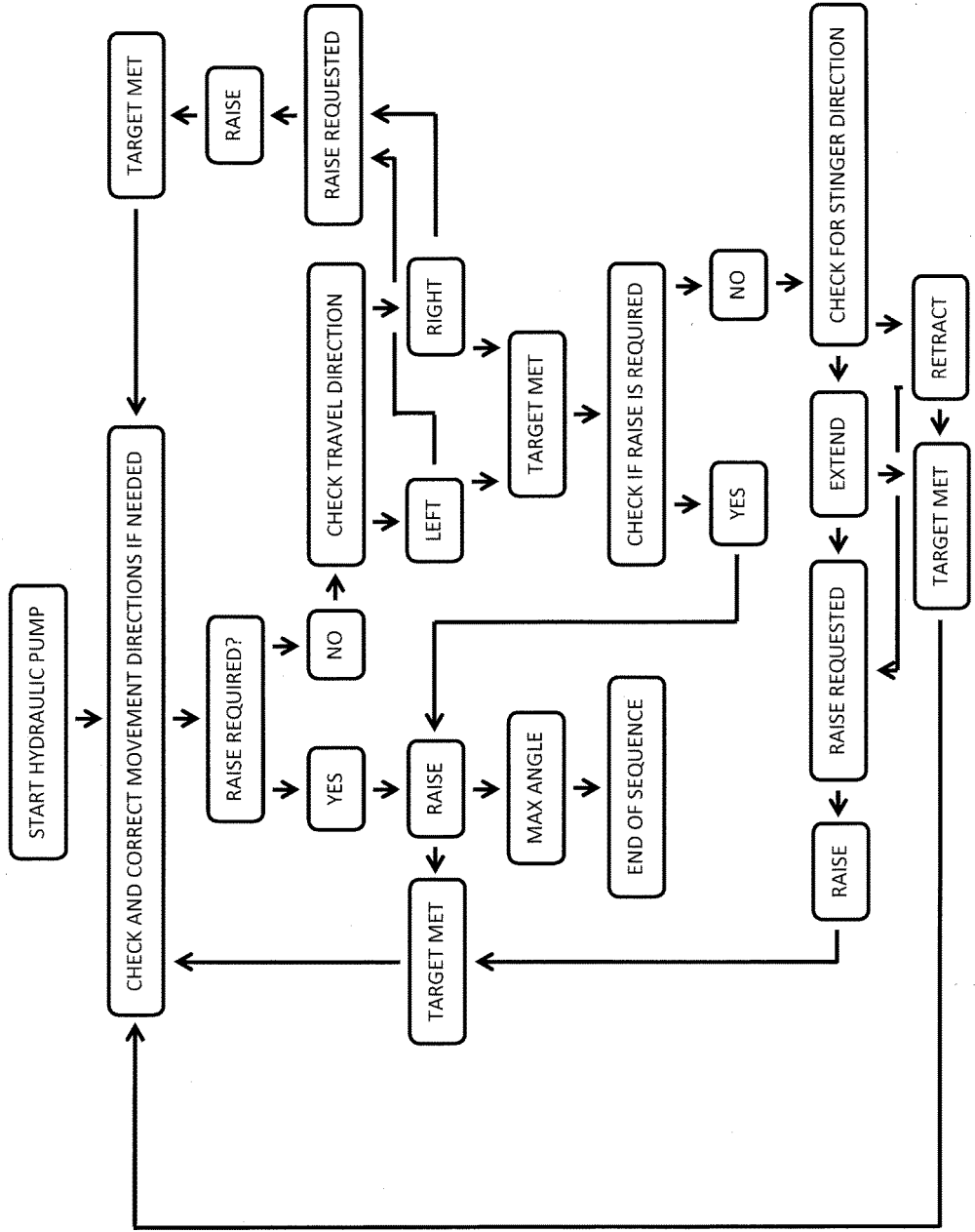
FIG. 9 is a flow chart illustrating the preferred method for controlling the production of a stockpile in the inline continuous mode.

Referring now to FIG. 9, a flow chart illustrating the preferred inline continuous mode process for producing a stockpile is provided. As shown in FIG. 9, preferred control system 20 automatically determines the location of the stockpile conveyor and whether the conveyor should be raised. If the conveyor does not need to be raised, then preferred control system 20 determines if the travel direction should be left or right, and again determines if a conveyor raise is required. If no conveyor raise is required, preferred control system 20 determines the stinger direction. The conveyor is continuously moving in this mode until the stockpile is completed. When the stockpile is sensed with the pile probe, preferred control system 20 raises the conveyor up to the next tier, adjusts its limits, and resumes building the stockpile. Once the maximum pile height is achieved, preferred control system 20 sounds a horn, retracts the stockpile conveyor inwardly to the retracted position, and drives the conveyor slightly off to the side of the completed stockpile. The resulting stockpile pattern is a series of radial portions that snake from side to side at the inner and outer boundaries.

Figure 10:
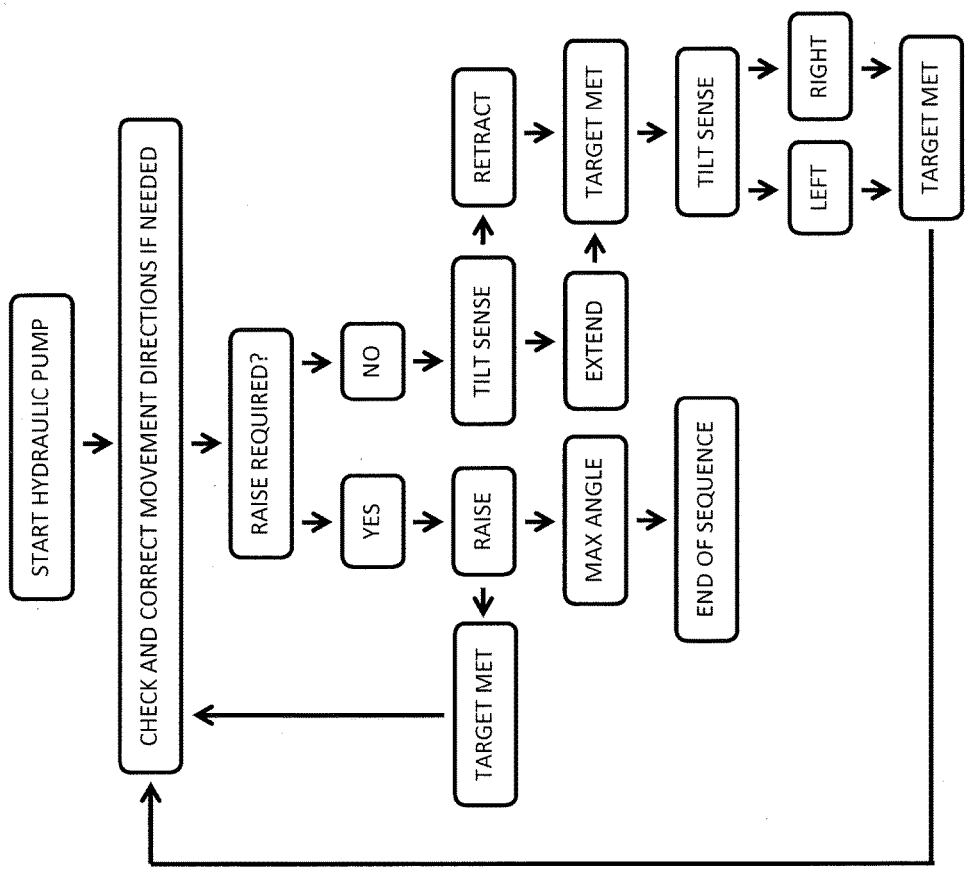
FIG. 10 is a flow chart illustrating the preferred method for controlling the production of a stockpile in the radial conical mode.

Referring now to FIG. 10, a flow chart illustrating the preferred radial conical mode process for producing a stockpile is illustrated. As shown in FIG. 10, preferred control system 20 automatically determines the location of the stockpile conveyor and whether the conveyor should be raised. If the conveyor does not need to be raised, then preferred control system 20 determines if the stinger should be extended or retracted, and whether the conveyor should be moved to the left or right using the pile probe. If a conveyor raise is required, preferred control system 20 raised the conveyor to a target elevation and repeats the process until the conveyor reaches its maximum angle. In this mode, the conveyor is not continuously moving. Also in this mode, an entire tier is built before the conveyor is raised up for the next tier. Preferably, the stockpile conveyor begins at a far corner of the stockpile pattern and moves from one side (left or right) to the other side and then retracts and moves from side to side again. When the entire tier is completed, preferred control system 20 raises the stockpile conveyor and the process is repeated until a maximum angle is reached. Once the maximum pile height is achieved, preferred control system 20 sounds a horn, retracts the stockpile conveyor inwardly to the retracted position, and drives the conveyor slightly off to the side of the completed stockpile. The resulting stockpile pattern is a plurality of conical piles in a plurality of arcuate rows.

The invention also comprises a method for controlling the production of a stockpile. The preferred method comprises providing a stockpile control system. The preferred stockpile control system comprises a sensor that is disposed on the stockpile conveyor, a limit switch that is disposed on the stockpile conveyor, a pile probe that is disposed on the stockpile conveyor, and a microprocessor that is in operative communication with the limit switch and the sensor. In the preferred stockpile control system, the stockpile conveyor is adapted to move, the sensor is adapted to measure the location of the stockpile conveyor, the limit switch is adapted to limit the movement of the stockpile conveyor, the pile probe is adapted to measure the vertical height of a stockpile, and the microprocessor is adapted to control the movement of the stockpile conveyor. The preferred method further comprises calculating one or more stockpile boundaries, and controlling the movement of the stockpile conveyor. Preferably, the stockpile control system substantially continuously calculates one or more stockpile boundaries and automatically adjusts the movement of the conveyor in substantially real time. Also preferably, the stockpile control system substantially continuously calculate a material flow depth and automatically adjust the movement of the conveyor in substantially real time.

In operation, several advantages of the preferred embodiments of the apparatus and method for a stockpile control system are achieved. For example, the preferred embodiments of the apparatus and method for a stockpile control system is adapted to measure and control the angle of a stockpile conveyor. Preferably, the conveyor angle is measured using an inclinometer that determines the angle of the conveyor relative to a horizontal plane. The preferred stockpile control system is also adapted to measure a stockpile and the distance between the stockpile and a stockpile conveyor. Preferably, a pile probe is used to measure the distance between the top of a stockpile and the stockpile conveyor such that the control system can determine when the stockpile conveyor should be raised or moved laterally. The preferred stockpile control system is also adapted to determine the maximum angle of the stockpile conveyor. Preferably, the maximum angle of the stockpile conveyor is automatically determined from the lowest of the following three settings: (1) the conveyor's physical maximum incline angle that it cannot physically raise beyond; (2) a maximum conveyor angle set by the user when trying to stay below a specific angle; and (3) calculations based off the pile settings to determine a peak angle to which the conveyor can build the pile. The third setting is determined by watching for the front and back edges of the pile converging or the left and right edges. Whichever edge converges at the lowest angle sets the maximum calculated pile angle.

The preferred embodiments of the apparatus and method for a stockpile control system are also constantly calculating the stockpile boundaries at the specified angle of incline. More particularly, the preferred stockpile control system continuously calculates the left edge or boundary of the pile, the right edge or boundary of the pile, the inner edge or boundary of the pile, the outer edge or boundary of the pile, and the maximum pile incline or elevation. The preferred stockpile control system is further adapted to continuously convert analog sensor signals into relevant positioning information. In some preferred embodiments, the stockpile control system includes a material flow sensor that continuously measures the depth of the stockpile material traveling over the conveyor belt.

The preferred embodiments of the apparatus and method for a stockpile control system are also adapted to control the incremental movement of the stockpile conveyor and prevent the stockpile from extending outside one or predetermined boundaries. More particularly, in the preferred stockpile control system, if the stockpile conveyor reaches a stockpile boundary prior to the final incremental movement in a particular direction, the control system will automatically stop the conveyor from moving past the boundary. Preferably, the stockpile control system includes a stinger switch that is adapted to prevent the conveyor from extending and retracting too far such that the stockpile would extend outside its outer or inner boundary, respectively, and a travel switch that is adapted to prevent the conveyor from pivotally moving too far to the left and too far to the right such that the stockpile would extend outside its left or right boundary, respectively.

The preferred stinger switch is adapted to automatically re-set to a distance of 0.0 when the stinger portion of the stockpile conveyor is in the fully retracted position even if the calculated value based on winch encoder pulses is not 0.0. As the stinger portion of the stockpile conveyor extends along its longitudinal axis, pulses received from the winch encoder are used to calculate the distance the stinger has moved. In the event that the actual distance the stinger portion of the stockpile conveyor has moved is its maximum distance (or its absolute value), preferred stinger switch will stop the stinger from extending any farther by overriding the current extension calculation, even if the distance calculated from the winch encoder pulses is less than the maximum distance.

The preferred travel switch is also adapted to limit the movement of the stockpile conveyor so as to maintain the stockpile within the left and right boundaries of the stockpile. The preferred stockpile control system includes a rotary encoder that continuously measures the radial angle of the stockpile conveyor as it pivotally moves about the pivot plate. Stockpile boundaries are preferably selected from a range of 45 to 315 degrees. The preferred travel switches include a trigger that can be tripped when encountered by an object like a log or a rock placed at the left and right boundaries of the stockpile. In the event of an error in the calculation of the radial angle of the stockpile conveyor, e.g. the pivot plate unintentionally moves, then the travel switch would cause the conveyor to stop at the left and right boundary and change its direction of travel. Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A stockpile control system adapted for use on a stockpile conveyor, said stockpile control system comprising:
   (a) a sensor, said sensor being disposed on the stockpile conveyor;
   (b) a limit switch, said limit switch being disposed on the stockpile conveyor;

(c) a pile probe; said pile probe being disposed on the stockpile conveyor;

(d) a microprocessor, said microprocessor being in operative communication with the limit switch and the sensor;

(e) a winch encoder adapted to determine a length of the stockpile conveyor along the longitudinal axis;

wherein the stockpile conveyor is adapted to move between a retracted position and an extended position along a stockpile conveyor longitudinal axis; wherein the sensor is adapted to measure the location of the stockpile conveyor; wherein the limit switch is adapted to limit the movement of the stockpile conveyor; wherein the pile probe is adapted to measure a distance between the stockpile conveyor and a stockpile; wherein the microprocessor is adapted to control the movement of the stockpile conveyor; and wherein the winch encoder is in operative communication with the microprocessor.

2. The stockpile control system of claim 1 wherein the stockpile conveyor is adapted to move pivotally about a vertical axis.

3. The stockpile control system of claim 2 wherein the sensor comprises a rotation sensor adapted to measure the pivotal movement of the stockpile conveyor about the vertical axis.

4. The stockpile control system of claim 1 wherein the stockpile conveyor is adapted to move pivotally about a horizontal axis.

5. The stockpile control system of claim 4 wherein the sensor comprises an angle sensor adapted to measure the pivotal movement of the stockpile conveyor about the horizontal axis.

6. The stockpile control system of claim 1 wherein the limit switch is adapted to limit the movement of the stockpile conveyor along the longitudinal axis.

7. The stockpile control system of claim 2 wherein the limit switch is adapted to limit the pivotal movement of the stockpile conveyor about the vertical axis.

8. The stockpile control system of claim 1 wherein the limit switch is adapted to reset to a predetermined absolute value in the event the limit switch is activated.

9. The stockpile control system of claim 1 wherein the limit switch comprises a hard-wired, redundant system.

10. The stockpile control system of claim 1 further comprising a graphical interface.

11. The stockpile control system of claim 1 wherein the system is adapted to substantially continuously calculate one or more stockpile boundaries and automatically adjust the movement of the stockpile conveyor in substantially real time.

12. The stockpile control system of claim 1 wherein the system is adapted to substantially continuously calculate a material flow depth and automatically adjust the movement of the stockpile conveyor in substantially real time.

13. The stockpile control system of claim 1 wherein the system is adapted to produce repeatable stockpiles.

14. A method for controlling the production of a stockpile, said method comprising:
(a) providing a stockpile control system, said stockpile control system comprising:
   a sensor, said sensor being disposed on the stockpile conveyor;
   (ii) a limit switch, said limit switch being disposed on the stockpile conveyor;
   (iii) a pile probe; said pile probe being disposed on the stockpile conveyor;
   (iv) a microprocessor, said microprocessor being in operative communication with the limit switch and the sensor;
   (v) a winch encoder adapted to determine a length of the stockpile conveyor along the longitudinal axis;
   wherein the stockpile conveyor is adapted to move between a retracted position and an extended position along a stockpile conveyor longitudinal axis; wherein the sensor is adapted to measure the location of the stockpile conveyor; wherein the limit switch is adapted to limit the movement of the stockpile conveyor; wherein the pile probe is adapted to measure the vertical height of a stockpile; wherein the microprocessor is adapted to control the movement of the stockpile conveyor; and wherein the winch encoder is in operative communication with the microprocessor;
(b) calculating one or more stockpile boundaries;
(c) controlling the movement of the stockpile conveyor.

15. The method of claim 14 wherein the stockpile control system substantially continuously calculates one or more stockpile boundaries and automatically adjusts the movement of the conveyor in substantially real time.

16. The method of claim 14 wherein the stockpile control system substantially continuously calculate a material flow depth and automatically adjusts the movement of the conveyor in substantially real time.

* * * * *